(12) United States Patent
Peterson et al.

(10) Patent No.: US 10,372,441 B2
(45) Date of Patent: Aug. 6, 2019

(54) BUILD ISOLATION SYSTEM IN A MULTI-SYSTEM ENVIRONMENT

(71) Applicant: Microsoft Technology Licensing, LLC, Redmond, WA (US)

(72) Inventors: Matthew Ross Peterson, Everett, WA (US); Carlo Rivera, Township of Washington, NJ (US); David Speirs, Woodinville, WA (US); Max David Bressler, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/425,775

(22) Filed: Feb. 6, 2017

(65) Prior Publication Data
US 2018/0150283 A1 May 31, 2018

Related U.S. Application Data (60) Provisional application No. 62/427,101, filed on Nov. 28, 2016.

(51) Int. Cl.
*G06F 8/70* (2018.01)
*G06F 11/14* (2006.01)
*G06F 8/71* (2018.01)

(52) U.S. Cl.
CPC .............. *G06F 8/70* (2013.01); *G06F 8/71* (2013.01); *G06F 11/1448* (2013.01); *G06F 11/1458* (2013.01)

(58) Field of Classification Search
CPC .... G06F 8/70; G06F 11/1448; G06F 11/1458; G06F 8/71

USPC .......... 717/120–123; 707/640–660, 667–671
See application file for complete search history.

(56) References Cited

U.S. PATENT DOCUMENTS

| | | | |
|---|---|---|---|
| 5,852,734 A | 12/1998 | Komatsu et al. | |
| 6,195,795 B1* | 2/2001 | Block | G06F 8/71 707/999.203 |
| 6,460,055 B1* | 10/2002 | Midgley | G06F 11/1461 707/640 |
| 7,519,953 B2 | 4/2009 | Reissman et al. | |

(Continued)

OTHER PUBLICATIONS

Alistar, Elvis., "Leveraging Unity Cloud Build for Testing Large Projects", Published on: Jun. 26, 2015 Available at: http://blogs.unity3d.com/2015/06/26/leveraging-unity-cloud-build-for-testing-large-projects/.

(Continued)

*Primary Examiner* — Qing Chen
(74) *Attorney, Agent, or Firm* — Merchant & Gould (57) ABSTRACT

Software build isolation is provided. Systems, methods and computer-readable devices provide for receiving a request from a user who is a member of a team or group for allocation of a machine from a pool of machines. A determination is made as to whether a limit has been reached on the number of machines available to the team or group. If the limit has not been reached, the machine is provisioned and the user is notified that the machine has been provisioned and allocated to the user. In addition, in response to receiving a notification that an asset is ready for backup, an asset is replicated on an archive server. Dependencies of the asset on dependent assets are determined and the dependent assets are replicated on the archive server.

9 Claims, 11 Drawing Sheets

(56) References Cited

U.S. PATENT DOCUMENTS

| | | | |
|---|---|---|---|
| 7,568,183 | B1 | 7/2009 | Hardy et al. |
| 8,020,044 | B2 | 9/2011 | Martinov |
| 8,312,430 | B2 | 11/2012 | Best et al. |
| 8,365,140 | B2 | 1/2013 | Heyhoe et al. |
| 8,713,554 | B1 | 4/2014 | Chopra et al. |
| 8,839,188 | B2 | 9/2014 | Chen et al. |
| 8,972,937 | B2 | 3/2015 | Gu |
| 9,256,450 | B2 | 2/2016 | Keating |
| 2004/0015413 | A1* | 1/2004 | Abu-Hejleh ............ G06Q 20/02 705/26.44 |
| 2004/0123280 | A1 | 6/2004 | Doshi et al. |
| 2005/0055518 | A1* | 3/2005 | Hochberg ......... G06F 17/30082 711/159 |
| 2006/0229895 | A1* | 10/2006 | Kodger, Jr. .......... G06Q 10/025 705/333 |
| 2009/0164530 | A1* | 6/2009 | Gilpin ................ G06F 11/1464 |
| 2009/0300580 | A1 | 12/2009 | Heyhoe et al. |
| 2010/0058294 | A1 | 3/2010 | Best et al. |
| 2010/0235611 | A1 | 9/2010 | Yamashita |
| 2011/0093744 | A1 | 4/2011 | Martinov |
| 2011/0161929 | A1* | 6/2011 | Keating ................ G06F 9/455 717/120 |
| 2011/0296386 | A1 | 12/2011 | Woollen et al. |
| 2012/0297359 | A1 | 11/2012 | Chen et al. |
| 2013/0152047 | A1 | 6/2013 | Moorthi et al. |
| 2015/0033202 | A1 | 1/2015 | Wilson et al. |
| 2015/0248280 | A1 | 9/2015 | Pillay et al. |
| 2016/0077927 | A1* | 3/2016 | Bhargava ............ G06F 11/1464 707/645 |
| 2016/0342421 | A1 | 11/2016 | Wilson et al. |
| 2017/0010889 | A1 | 1/2017 | Spektor et al. |
| 2018/0081784 | A1 | 3/2018 | Rivera et al. |
| 2018/0150286 | A1 | 5/2018 | Speirs et al. |

OTHER PUBLICATIONS

"Understanding the Bamboo CI Server", Published on: Sep. 10, 2015 Available at: https://confluence.atlassian.com/bamboo/understanding-the-bamboo-ci-server-289277285.html.

"Buildbot", Retrieved on: Jun. 7, 2016 Available at: http://buildbot.net/#/basics.

Ritchie, Stephen, "TeamCity vs Jenkins: Which is the Better Continuous Integration (CI) Server for .NET Software Development?", Published on: Nov. 20, 2012 Available at: https://www.excella.com/insights/teamcity-vs-jenkins-better-continuous-integration-server.

"LAVA", Published on: May 27, 2016 Available at: http://www.linaro.org/initiatives/lava/.

Horrik, Geert Van, "Automatic builds via FinalBuilder and Continua CI", Published on: Sep. 1, 2013 Available at: http://geertvanhorrik.com/2013/09/01/automatic-builds-via-finalbuilder-and-continua-ci/.

"Jenkins—Automated Testing", Published on: Dec. 6, 2015 Available at: http://www.tutorialspoint.com/jenkins/jenkins_automated_testing.htm "Jenkins", Retrieved on: Jun. 14, 2016 Available at: https://jenkins.io/.

"Notice of Allowance Issued in U.S. Appl. No. 15/425,834", dated Jun. 18, 2018, 2 Pages.

"Notice of Allowance Issued in U.S. Appl. No. 15/425,834", dated Jun. 4, 2018, 18 Pages.

"Non Final Office Action Issued in U.S. Appl. No. 15/438,885", dated May 4, 2018, 16 Pages.

"Notice of Allowance Issued in U.S. Appl. No. 15/438,885", dated Dec. 19, 2018, 17 Pages.

* cited by examiner

MOBILE COMPUTING DEVICE

BUILD ISOLATION SYSTEM IN A MULTI-SYSTEM ENVIRONMENT

RELATED APPLICATION

This application claims benefit of U.S. Provisional Patent Application No. 62/427,101 titled "BUILD ISOLATION SYSTEM IN A MULTI-SYSTEM ENVIRONMENT" filed on Nov. 28, 2016, the entirety of which is hereby incorporated by reference.

BACKGROUND

When developing a software product, the code base for the product can be extensive. As such, building, testing, and validating a product can be very time-consuming, challenging, and can require tremendous hardware resources. When performing a build, developers need access to a range of machine power, from basic desktop power to high-end, server-class machines. However, the power required by a given developer is not constant over time, with the developer needing more power at some times and less power at other times.

In addition, when developing a software product, the code base can be very large with a tremendous number of interdependencies between parts of the code. Various parts of the code may be dependent on other parts of the code, but the code for the various parts may be updated at different times. Backing up such a code base can be difficult and unwieldy.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer storage medium for a software build isolation in a multi-system environment. In one aspect, a system is provided for allocating machines to a user from a pool of machines. A system comprising a computing device is provided. The computing device includes: at least one processing device and at least one computer readable data storage device storing instructions. The instructions when executed receive a request from a user who is a member of a team for allocation of a machine from a pool of machines. The instructions check if a limit has been reached on the number of machines available to the team. If the limit has not been reached, the machine is provisioned, and the user is notified that the machine has been provisioned and allocated to the user.

Additional aspects include a method for providing automatic allocation of machines in a multi-machine build environment. The method receives a request for changes to a code base in a plurality of tenants. The method allocates a machine for each of the respective plurality of tenants. The plurality of tenants is checked-out and the code base is built on each of the plurality of machines. The method then checks the built code base back into the plurality of tenants.

Additional aspects include a backup system for a multi-tenant environment. The method receives a notification that an asset is ready for backup and replicates the asset on an archive server. The method determines dependencies of the asset on dependent assets, and replicates the dependent assets on the archive server.

Examples are implemented as a method, computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Figure 1:
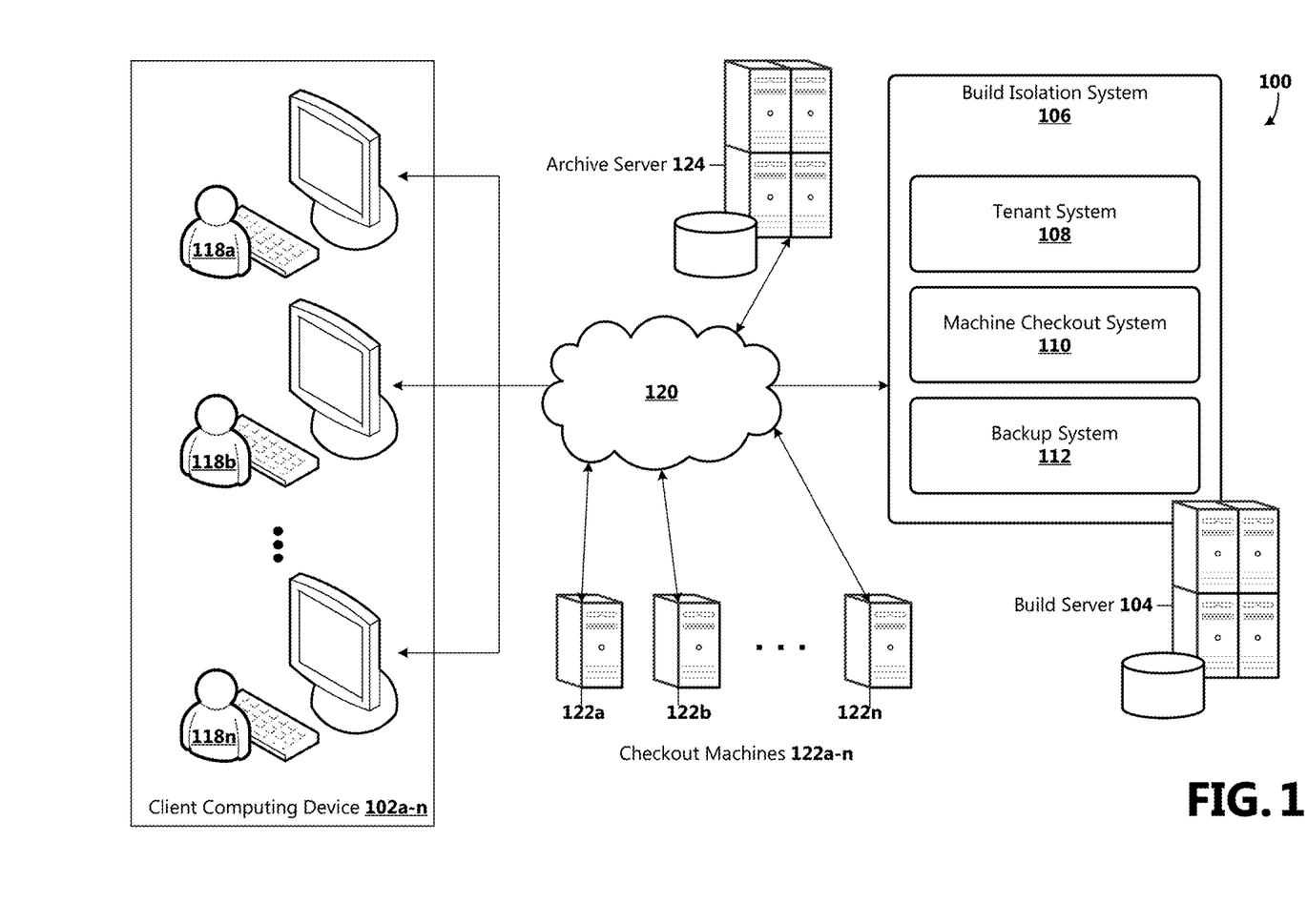
FIG. 1 is a block diagram of an example operating environment for software build isolation in a multi-system environment, for automatic allocation of machines in a multi-machine build environment, and for backup in a multi-tenant environment.

Aspects of the present disclosure are directed to a method, system, and computer storage medium for software build isolation in a multi-system environment, for automatic allocation of machines in a multi-machine build environment, and for backup in a multi-tenant environment. With reference now to FIG. 1, an example operating environment 100 including a build isolation system 106 is shown. The example operating environment 100 includes one or more client computing devices 102a-n (collectively, 102) via which users 118a-n (collectively, 118) (e.g., software developers) can use to write and edit source code that is used to build a particular software system application, or software component. The client computing devices 102 can be a variety of machines, including machines running the WINDOWS® operating system (available from Microsoft Corp. of Redmond, Wash.), MACOS® operating system (available from Apple, Inc. of Cupertino, Calif.), UNIX® operating system (available from the Open Group of Reading, UK), or represent a computing device in the cloud. The client computing devices 102 are operative to communicate over a network 120, which may include wired or wireless networking, with a build server 104. For example, the build server 104 is illustrative of one or more computing devices operative to compile computer source code into binary code, package binary code, and run automated tests. The hardware of these computing devices is discussed in greater detail in regard to FIGS. 8, 9A, 9B, and 10.

The build isolation system 106 is executed on or communicatively connected to the build server 104. According to an aspect, the build isolation system 106 comprises a tenant system 108, a machine checkout system 110, and a backup system 112. The machine checkout system is responsible for assigning checkout machines 122a-n (collectively 122) to a particular user 118 for a period of time. Checkout machines 122 range in power from basic desktop class machines to high end, server-class machines. Archive servers 124 are used to backup assets by the backup system 112.

Figure 2:
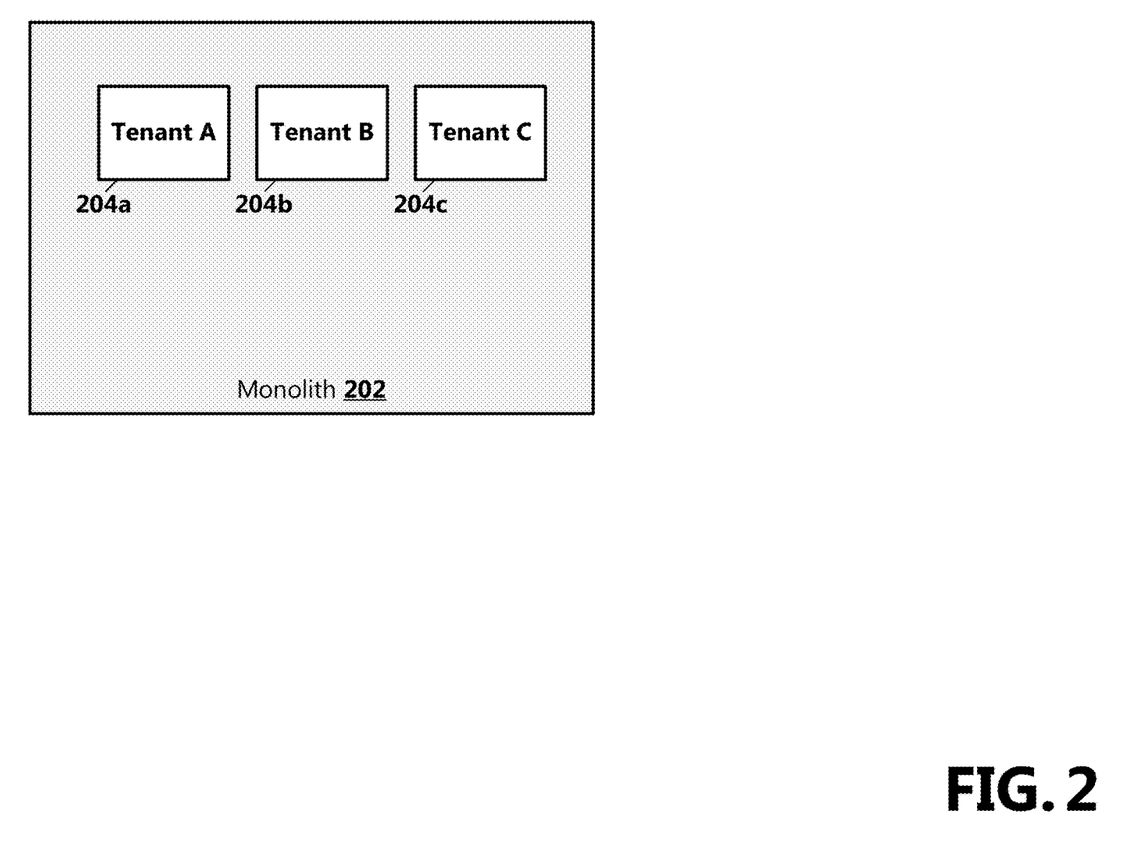
FIG. 2 is a block diagram illustrating a tenant model.
Figure 3:
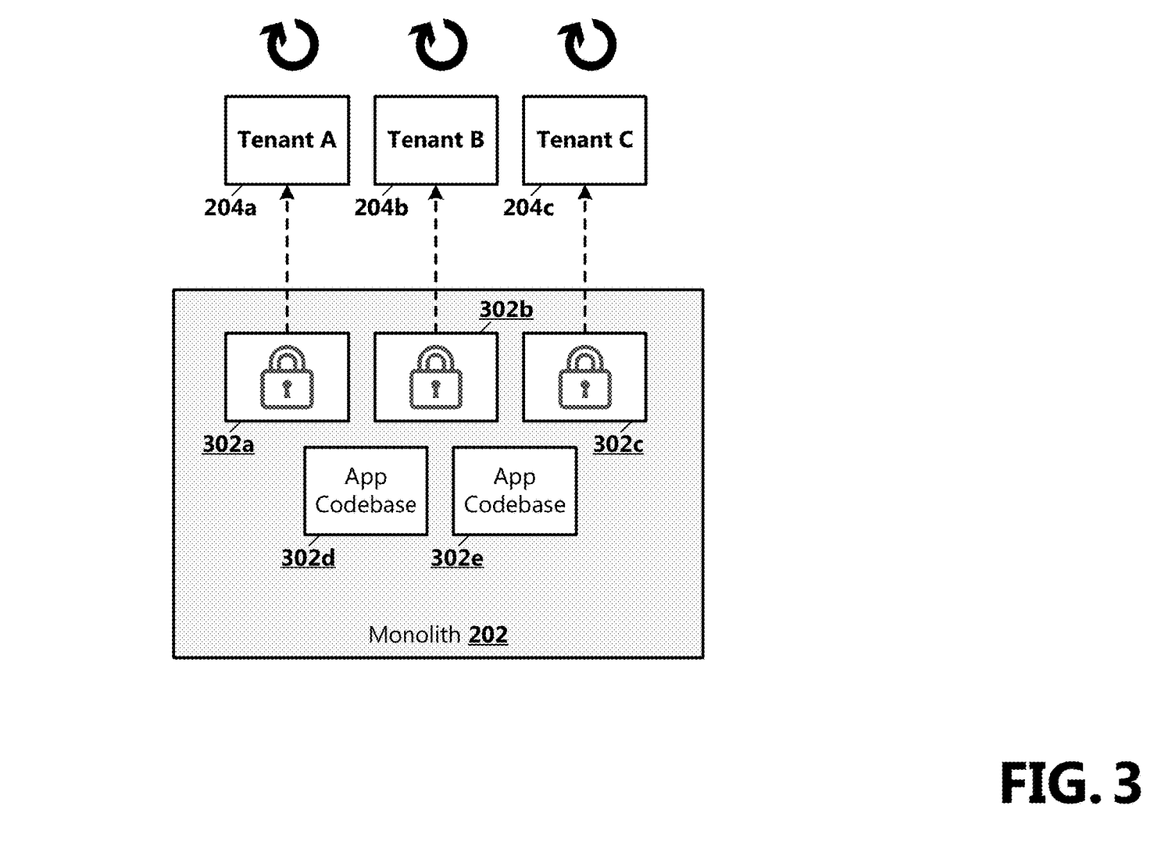
FIG. 3 is a block diagram illustrating a monolithic codebase segregated into a plurality of tenants.

With reference now to FIG. 2, the tenant system 108 is illustrative of a software module, system, or device operative to isolate sections of a monolithic codebase 202 for efficient build and validation. For example and as also illustrated in FIG. 3, a monolithic codebase 202 is segregated into a plurality of smaller sections or tenants 204a-c (collectively, 204) such that check-ins either go inside or outside the tenant, but not both at once. According to aspects, tenants 204 can automatically consume newer binary dependencies when available based on a signal, and can submit their own tenant sources to the main when validated. For example, upstream dependencies may be consumed via forward integration, and changes may be published back to the monolith 202 via reverse integration. In some examples, different application codebases 302 (FIG. 3) may depend on a single shared library that they all consume. According to an aspect, in a tenant model environment, the different application codebases 302 continue to take the shared component as an input into the system even though they all build individually and separately.

According to an example, in the absence of tenants 204, users 118 work together in one large branch, and all users 118 get builds on a same cadence. The tenant system 108 enables users 118 to check in and verify changes in a shorter time period. For example, if a typical application build in a monolith model environment is on a 36-hour cadence, in a tenant model environment, a turnaround time may include checkpoints every 0.5-3 hours with shippable releases every 3-4 hours. According to an aspect, the tenant system 108 can allow development users 118 or teams to ship independently. For example, if one team wants to ship every three years, and another team wants to ship every day, by breaking the monolithic codebase 202 into smaller pieces or tenants 204, the same code can effectively be released at different rates by mirroring and building it separately and then releasing on its own path.

Figure 4:
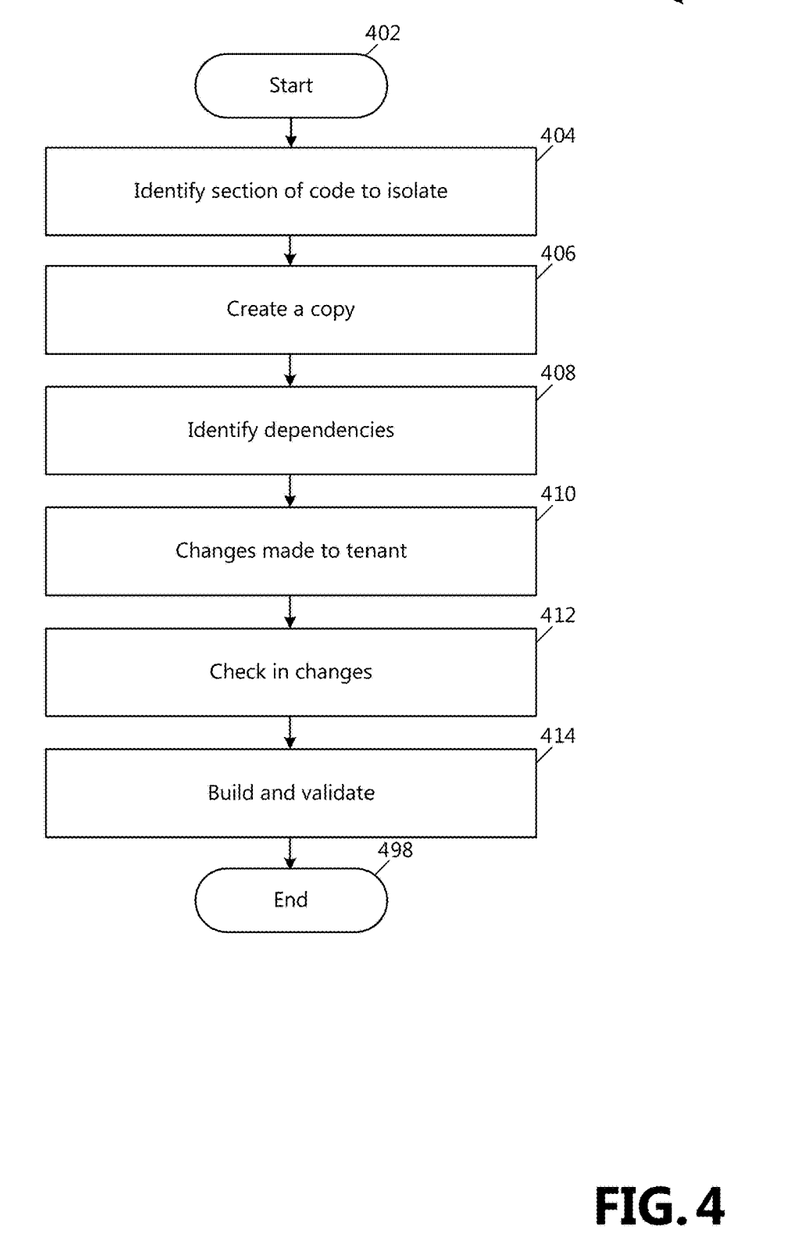
FIG. 4 is a flow chart showing general stages involved in an example method for tenantizing a codebase.

With reference now to FIG. 4, a flowchart showing general stages involved in an example method 400 for tenantizing a monolithic codebase 202 is illustrated. The method 400 starts at OPERATION 402, and proceeds to OPERATION 404, where a section of a monolithic codebase 202 to isolate is identified. At OPERATION 406, the section of code is locked in the main branch, a copy of the code is made, and a tenant 204 is created. The method 400 proceeds to OPERATION 408, where dependencies are identified. At OPERATION 410, changes are made to the tenant 204. At OPERATION 412, the changes are checked in. In some examples, the changes are checked into the copy made of the code. The method 400 proceeds to OPERATION 414, where the changes are built and verified/validated. Each time a user 118 or team does check in, the codebase can be built quickly, and the user 118 is enabled to find out quickly whether the changes pass or fail. In case of a fail, a defined action can be taken as will be described below. The method 400 ends at OPERATION 498.

Figure 5:
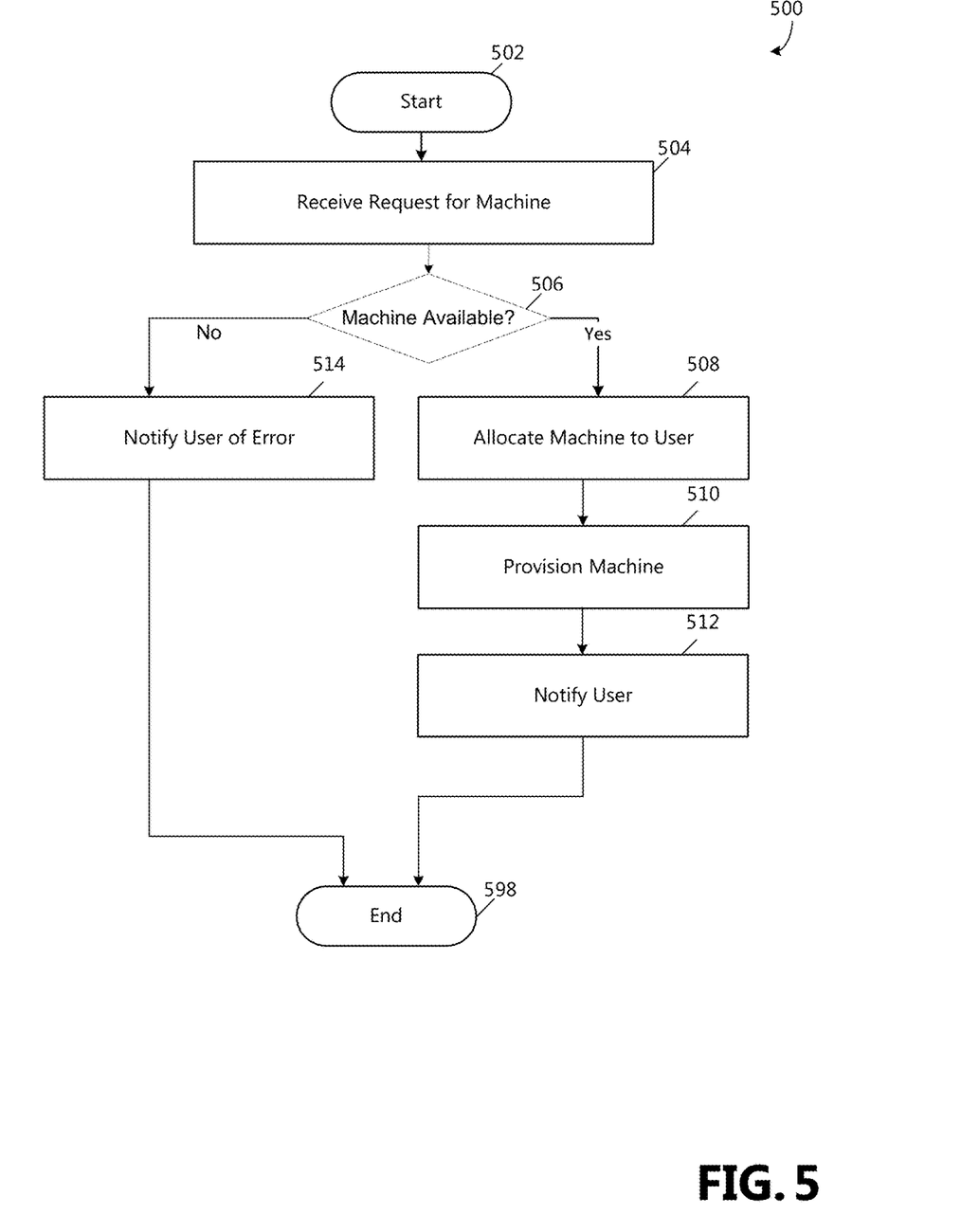
FIG. 5 is a flow chart showing general stages involved in an example method for allocating machines based on user requests.

With reference now to FIG. 5, a flow chart showing general stages involved in an example method 500 for allocating machines based on user requests is illustrated. Through method 500, a bank of machines 122 can be set aside and allocated to users 118 as needed on short notice for short periods of time. Machines 122 can range from basic desktop machines to high end, server-class machines. Because it is far too expensive to give high end, server class machines to all users 118 (typically developers), method 500 permits efficient allocation of these machines 122 on an as-needed basis. Furthermore, managers can establish various allocation limits for each of their teams, establishing how many machines a given team may have allocated during any given point in time. For example, a manager may state that Team A can have access to three machines 122 today, Team B can have access to ten machines 122 today, and Team C can have access to one machine 122 today. Different allocation limits may be established for different days or times.

Starting at OPERATION 502 and proceeding to OPERATION 504, a request from the user 118 is received for a machine 122 to be checked out by the user 118. The request may be made via a webpage, for example, where the user 118 would insert values about the code that the user 118 wishes to build and the class of machine that the user 118 wishes to have allocated. Method 500 continues to OPERATION 506 where a check is made to see if a machine 122 is available. A machine 122 is available if the allocation limit for the user's team has not been met or exceeded. If a machine 122 is not available, at OPERATION 514, the user 118 is notified of the unavailability of any machines 122. The user's manager may also be notified and given the opportunity to change the allocation limit for that team to permit the user 118 to be allocated a machine 122. If this occurs, flow returns to OPERATION 508.

If a machine is available, method 500 continues at OPERATION 508 where a machine 122 is allocated to user 118. After a machine 122 is allocated, method 500 continues at OPERATION 510 where the machine 122 is provisioned. Provisioning a machine 122 may include installing an operating system and installing developmental tools. After the machine 122 is provisioned, method 500 continues to OPERATION 512 where the user 118 is notified (typically by email) that a machine 122 has been allocated. When a user 118 is done using a machine 122 or when a time limit is met, the machine 122 is checked back into the pool of available machines 122. When a machine 122 is checked back into the pool, it may be wiped of all provisioned information.

Figure 6:
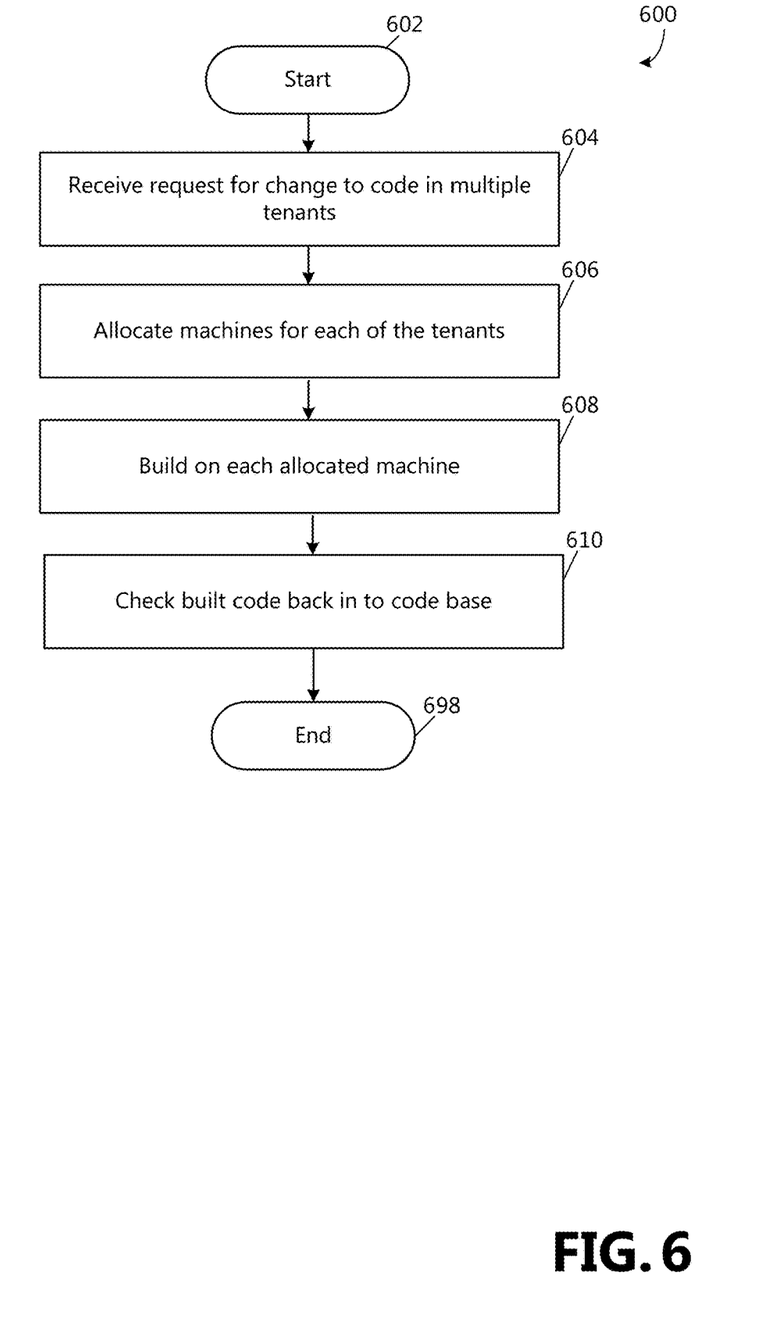
FIG. 6 is a flow chart showing general stages involved in an example method for allocating machines based on code builds.

Turning to FIG. 6, a flow chart showing general stages involved in an example method 600 for allocating machines 122 based on code builds is illustrated. At times, developers make changes to a section of shared code that will require changing a plurality of smaller tenants 204. Previously, a user 118 had to manually set up all of the machines 122 for each build, check each tenant 204 out, build each tenant 204, and then check each tenant 204 back in. Method 600 automates this process.

Starting at OPERATION 602 and proceeding to OPERATION 605, method 600 receives a request to change code that resides in multiple tenants 204. A machine 122 is allocated for each of the tenants 204 in OPERATION 606. Allocation of machines 122 was previously described with respect to FIG. 5, but briefly each machine 122 is provisioned with an operating system and developmental tools. The code from tenant 204 is checked out and placed on its allocated machine 122. Method 600 proceeds to OPERATION 608 where the code is built on each allocated machine 122. Following allocation, method 600 continues at OPERATION 610 where the code is checked back into the code base for each tenant 204, and the checked out machine 122 is also checked back in.

Figure 7:
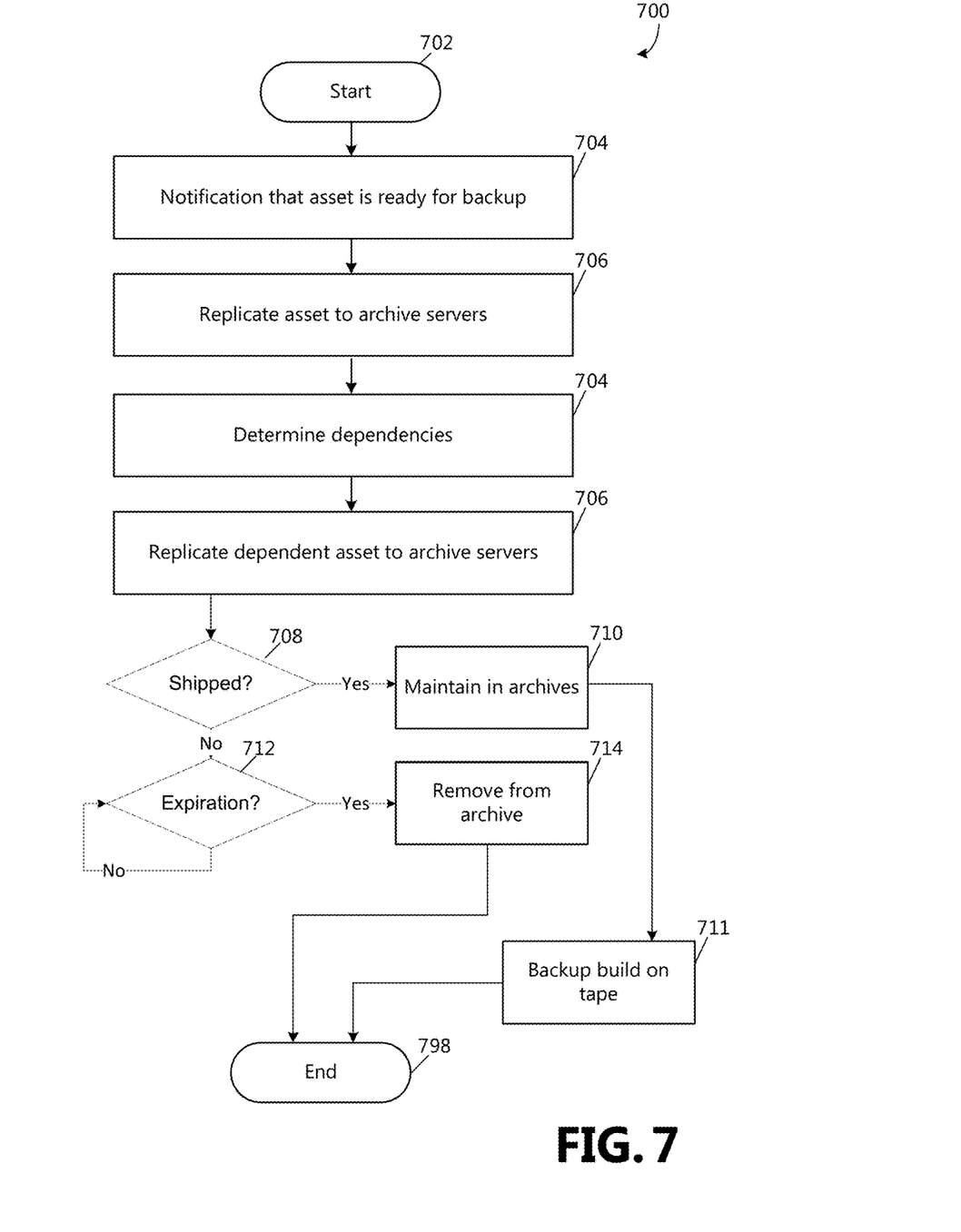
FIG. 7 is a flow chart showing general stages involved in an example method for backing up assets.

Turning to FIG. 7, a flow chart showing general stages involved in an example method 700 for backing up assets is illustrated. In the past, it has often been a problem backing up code and deleting code that is no longer needed. This becomes even more complex when the code base is maintained in multiple tenants 204. In order to rectify this situation, method 700 provides an automated method for backing up assets, where assets can be code, documents, or any type of file where retention of a backup would be desired.

Furthermore, the user 118 of the system, i.e., those developers working on the codebase, does not care where the underlying codebase resides. The codebase could be on various classes of servers, such as a fast server or a slow server, where the slow server is typically an archive server. Servers facing the user 118 are just pointers to the underlying assets which may be spread across multiple classes of servers. For example, originally a pointer to the asset may point to an asset on a fast server. The asset may then be replicated to a slow server, but the pointer may remain pointed to the fast server. At an appropriate time, the asset at the fast location may be deleted, and the pointer may be updated to point to the slow server. The asset will remain on the slow server for a period of time before it too is deleted.

Method 700 starts at OPERATION 702 and continues to OPERATION 704 where the method 700 receives a notification that an asset is ready for backup. This notification may be triggered by a user 118 or by a scheduling system that automatically schedules backups on a regular basis. In addition, this notification may be triggered by a build having successfully occurred on a tenant's code base. After the notification is received, at OPERATION 706 the asset is replicated to archive server 124. Typically, the asset resides on a machine with a faster retrieval time, a fast server, than the retrieval time from an archive server 124.

At OPERATION 704, dependencies of the asset are determined. Dependencies have previously been discussed with reference to FIGS. 3 and 4. Often tenants 204 have code dependencies on other tenants 204, such that when one tenant 204 changes and requires a backup, it may be beneficial to also backup the tenants 204 from which it depends. Once dependent assets are determined, at OPERATION 706 additional dependent assets may be replicated to the archive server 124.

Method 700 continues at OPERATION 708 where a check is made to see if the asset has been shipped out to customers. If so, the asset and dependent assets are maintained in the archive server 124 at OPERATION 710, and the method 700 continues to OPERATION 711, where the asset and dependent assets are backed up on tape. Following backup, method 700 ends at OPERATION 798. If the asset has not shipped to customers, a check is made at OPERATION 712 to see if a time limit on archiving has been met. If the time limit has been met, method 700 proceeds to OPERATION 714 where the asset is removed from the archive server 124 and may also be removed from its original location. Following removal, method 700 proceeds to OPERATION 798 and stops.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
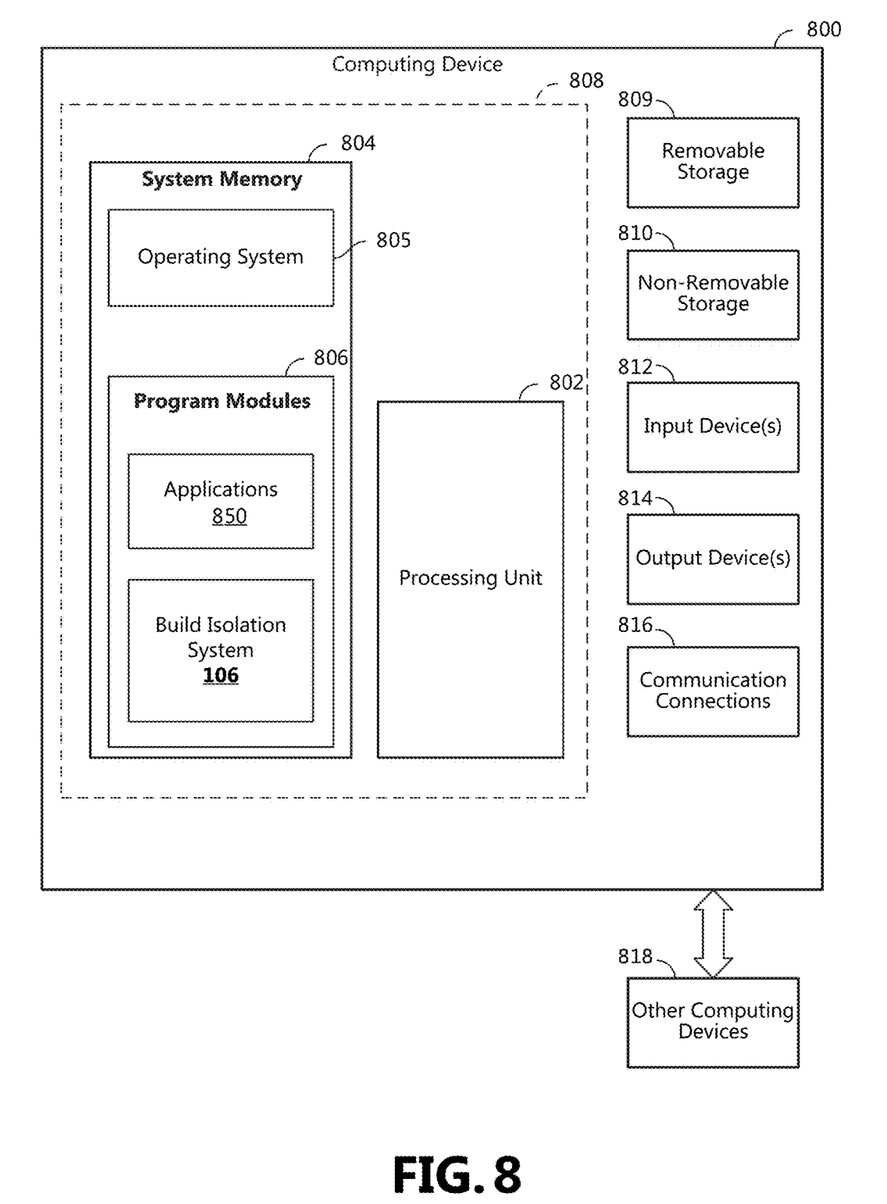
FIG. 8 is a block diagram illustrating example physical components of a computing device.
Figure 9A:
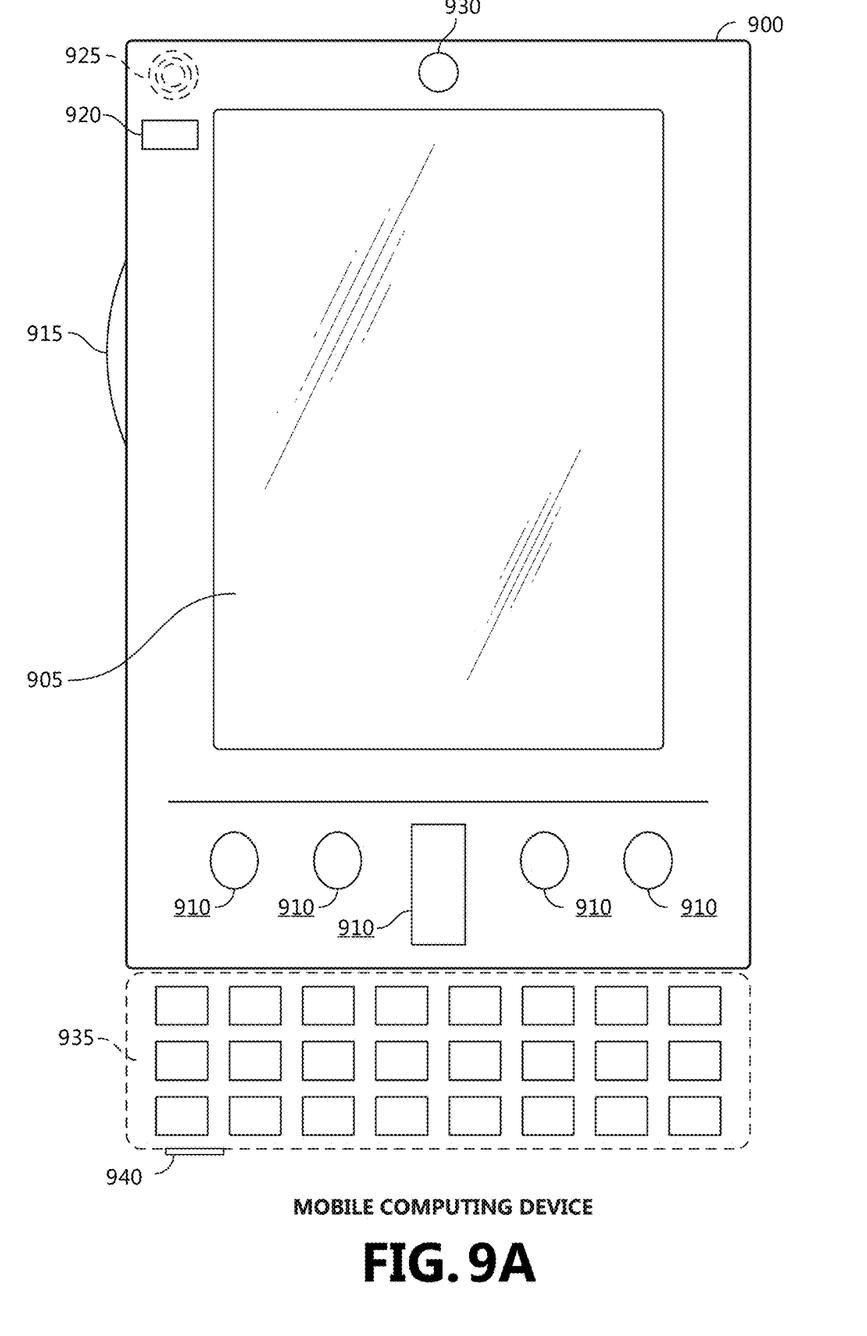
FIGS. 9A and 9B are simplified block diagrams of a mobile computing device.
Figure 9B:
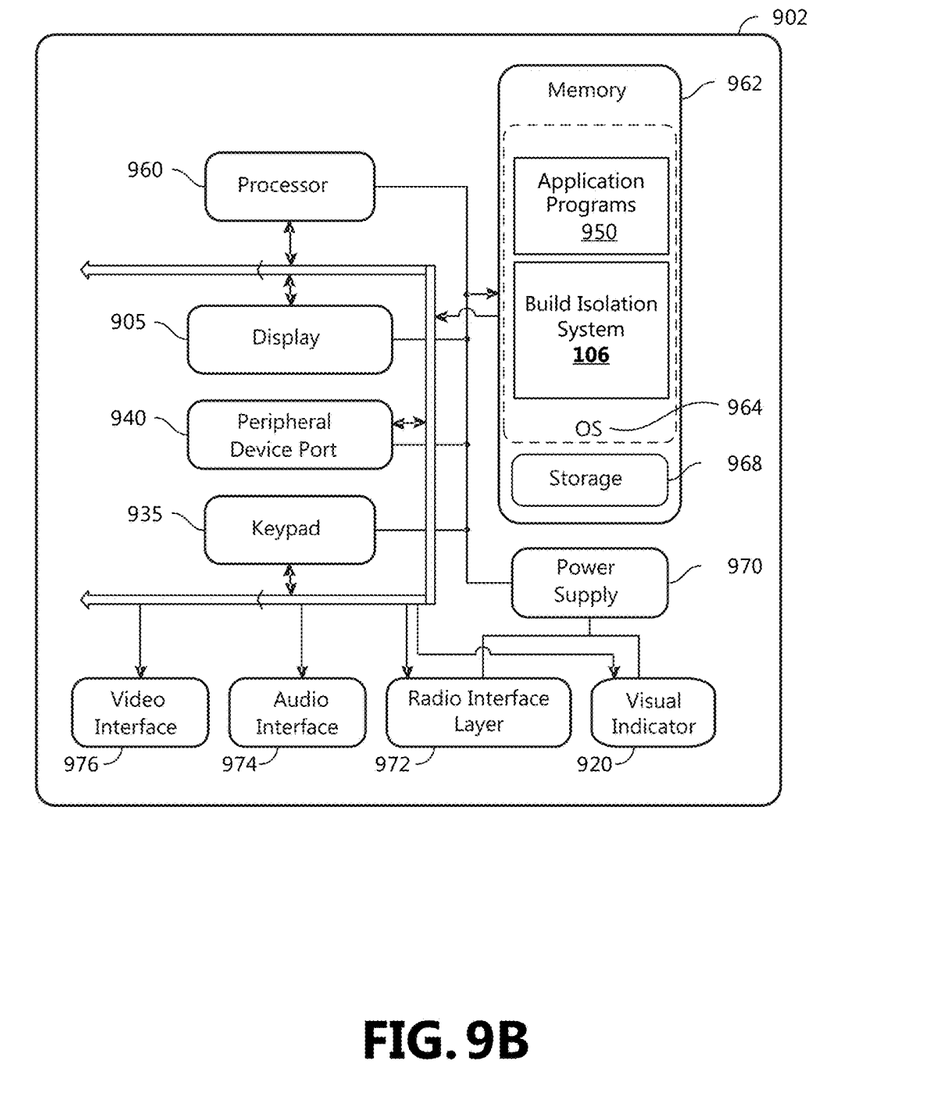
Figure 10:
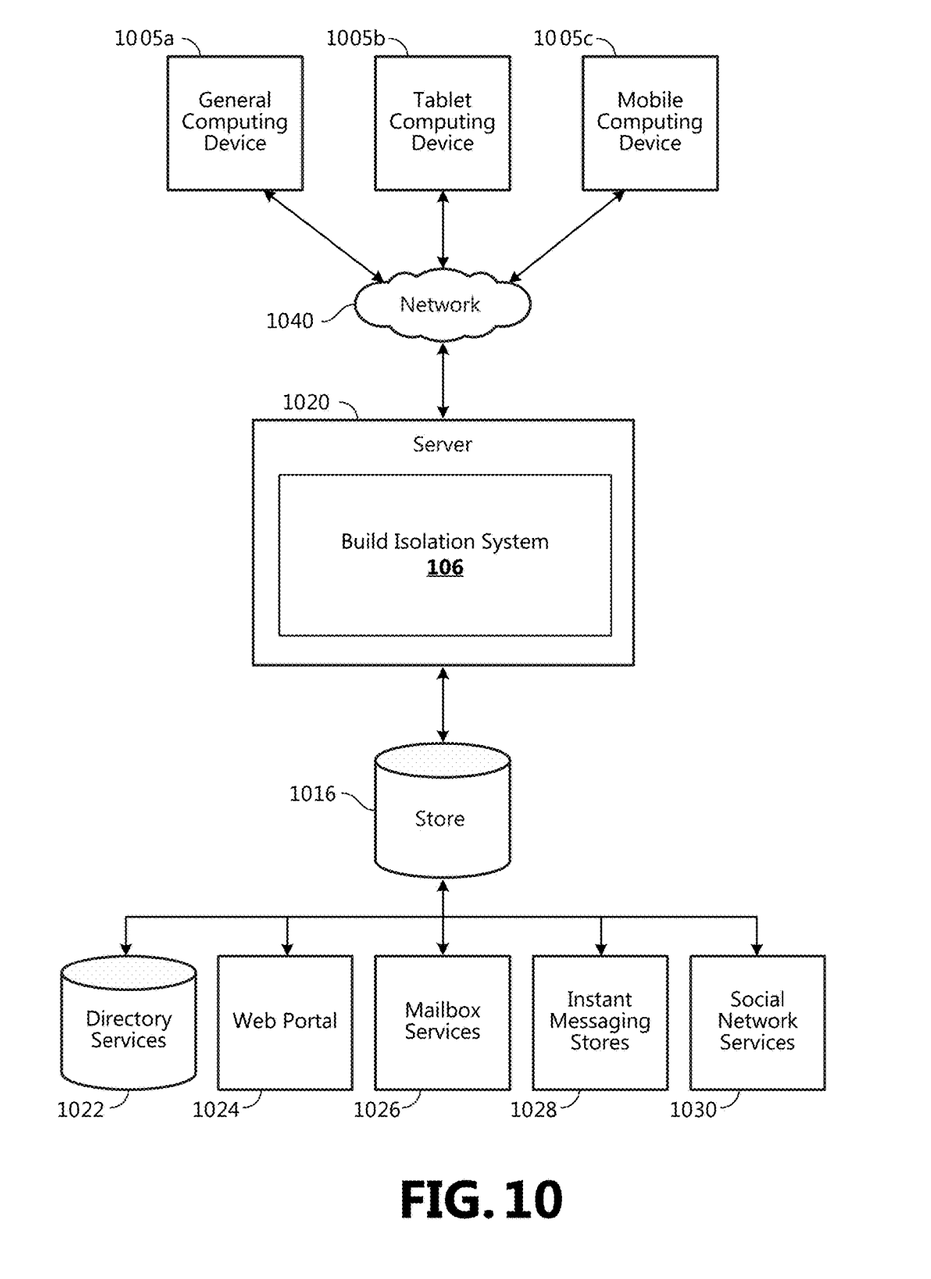
FIG. 10 is a simplified block diagram of a distributed computing system.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are utilized for practicing aspects, described herein.

FIG. 8 is a block diagram illustrating physical components (i.e., hardware) of a computing device 800 with which examples of the present disclosure may be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes the build isolation system 106. The operating system 805, for example, is suitable for controlling the operation of the computing device 800. Furthermore, aspects are practiced in conjunction with a graphics library, other operating systems, or any other application program, and is not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., build isolation system 106) perform processes including, but not limited to, one or more of the stages of the methods 400, 500, 600, 700 illustrated in FIGS. 4, 5, 6, and 7. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, the build isolation system 106 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

FIG. 10 illustrates one example of the architecture of a system for software build isolation in a multi-system environment, for automatic allocation of machines in a multi-machine build environment, and for backup in a multi-tenant environment. Content developed, interacted with, or edited in association with the build isolation system 106 is enabled to be stored in different communication channels or other storage types. For example, various documents may be stored using a directory service 1022, a web portal 1024, a mailbox service 1026, an instant messaging store 1028, or a social networking site 1030. The build isolation system 106 is operative to use any of these types of systems or the like for automatically managing and validating a codebase, as described herein. According to an aspect, a server 1020 provides the build isolation system 106 to clients 1005a,b,c. As one example, the server 1020 is a web server providing the build isolation system 106 over the web. The server 1020 provides the build isolation system 106 over the web to clients 1005 through a network 1040. By way of example, the client computing device is implemented and embodied in a personal computer 1005a, a tablet computing device 1005b or a mobile computing device 1005c (e.g., a smart phone), or other computing device. Any of these examples of the client computing device are operable to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method, comprising:
receiving, by a processing device, a first notification that an asset is ready for backup, wherein the asset is a tenant code of a monolithic code, wherein the first notification is generated after a successful build of the tenant code of the monolithic code, and wherein the successful build of the tenant code of the monolithic code occurs when the tenant code of the monolithic code is checked in;
in response to the successful build of the tenant code of the monolithic code and receipt of the first notification, replicating, by the processing device, the asset on an archive server;
determining, by the processing device, dependencies of the asset on dependent assets; and
replicating, by the processing device, the dependent assets on the archive server, wherein the dependent assets are part of the monolithic code but not part of the tenant code of the monolithic code.

2. The method of claim 1, further comprising:
receiving a second notification that the asset is ready for backup, wherein receiving the second notification comprises receiving the second notification from a user;
in response to the receipt of the second notification, repeating the replication of the asset on the archive server;
repeating the determination of the dependencies of the asset on the dependent assets; and
repeating the replication of the dependent assets on the archive server.

3. The method of claim 1, further comprising:
receiving a second notification that the asset is ready for backup, wherein receiving the second notification comprises receiving the second notification from a scheduler;
in response to the receipt of the second notification, repeating the replication of the asset on the archive server;
repeating the determination of the dependencies of the asset on the dependent assets; and
repeating the replication of the dependent assets on the archive server.

4. The method of claim 1, further comprising determining if the asset has been electronically delivered to a customer.

5. The method of claim 4, further comprising maintaining the asset on the archive server if the asset has been electronically delivered to the customer.

6. The method of claim 4, further comprising determining if a time limit has expired if the asset has not been electronically delivered to the customer.

7. The method of claim 6, further comprising removing the asset from the archive server if the time limit has expired.

8. The method of claim 6, further comprising removing the asset from an original location of the asset if the time limit has expired.

9. The method of claim 4, further comprising maintaining the dependent assets on the archive server if the asset has been electronically delivered to the customer.

* * * * *